Oct. 30, 1934.　　　F. L. WOLF　　　1,978,830
TROLLEY WIRE DEVICE
Filed March 31, 1934
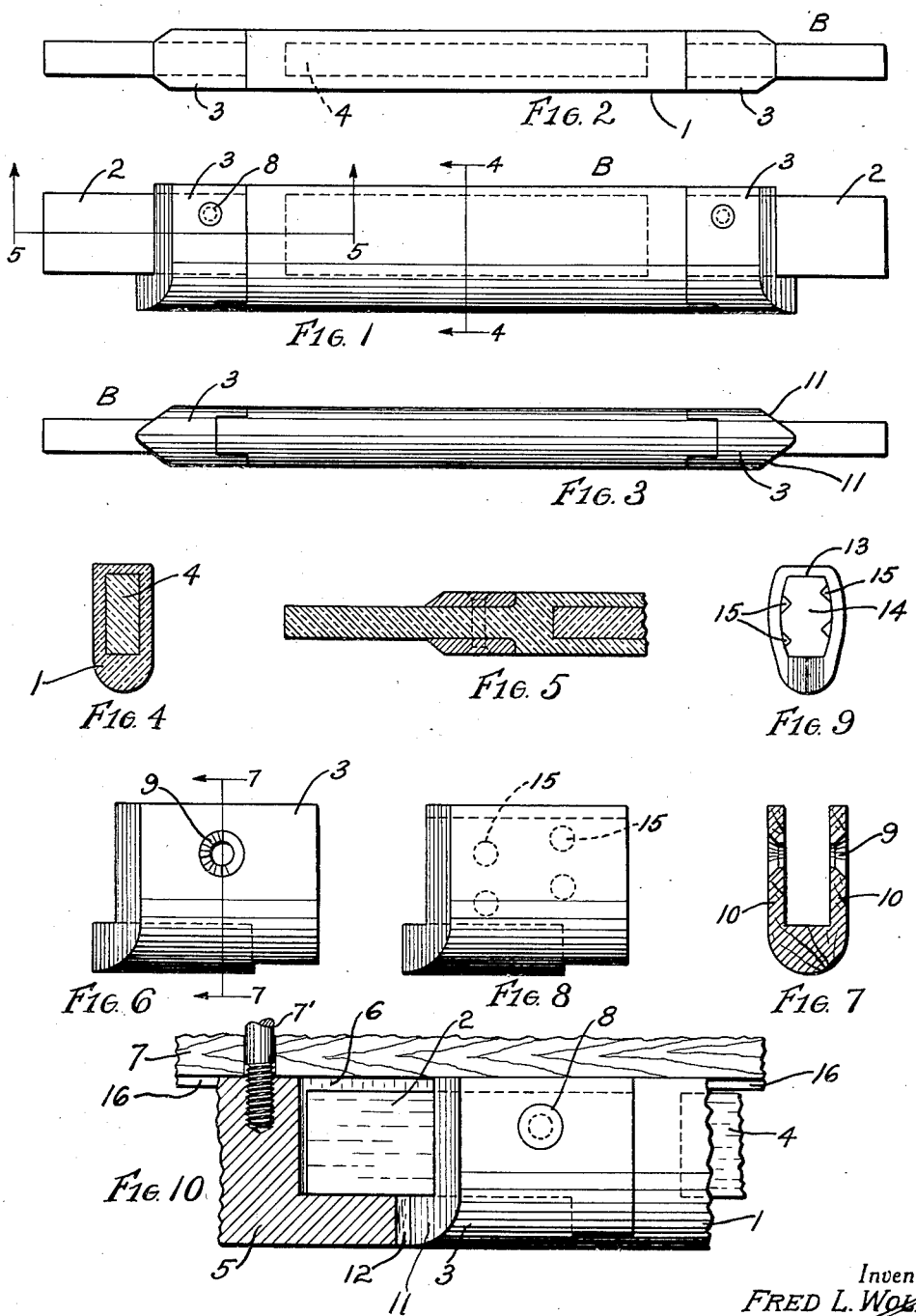
Inventor
FRED L. WOLF
By
Attorney Patented Oct. 30, 1934

1,978,830

UNITED STATES PATENT OFFICE 1,978,830

TROLLEY WIRE DEVICE

Fred L. Wolf, Mansfield, Ohio, assignor to The Ohio Brass Company, Mansfield, Ohio, a corporation of New Jersey Application March 31, 1934, Serial No. 718,425

14 Claims. (Cl. 191—39)

My invention relates to bridging members for use with trolley wire supports and insulators and is particularly adapted for use with sectionalizing insulators as shown by Matthes Patent 1,773,192.

One object of my invention is to provide a bridging member in which the insulating portion is made substantially of a rubber composition which may be vulcanized to a tough resilient deformable body.

Another object of my invention is to provide a bridging member which can be easily assembled in position or renewed when desirable.

Other objects will be disclosed later in this specification.

My invention resides in the new and novel construction, combination and relation of the various parts herein described and shown in the attached drawing.

In the drawing:—

Fig. 1 is a side view of my invention.

Figs. 2 and 3 are top and bottom views respectively of Fig. 1.

Figs. 4 and 5 are sections on the lines 4—4 and 5—5 respectively of Fig. 1.

Fig. 6 is a side view of a terminal member.

Fig. 7 is a sectional view on the line 7—7 of Fig. 6.

Fig. 8 is a side view of a modified form of terminal member.

Fig. 9 is an end view of Fig. 8.

Fig. 10 shows one end of the bridging member assembled in position with respect to the device shown in Patent 1,773,192.

In the preferred embodiment of my invention I provide a bridging member or runner B having a body composed of a rubber compound which has been vulcanized to a tough resilient and deformable condition and having a main or intermediate portion 1 and projecting end portions 2.

The portion 1 is considerably larger as compared with the end portions 2 which are reduced in size to receive the terminal members 3. The body B is formed in a continuous piece from end to end and of the desired shape which is easily accomplished by suitable molds in which the rubber composition is placed and then subjected to a vulcanizing or curing heat.

In order to give the intermediate portion 1 a desired amount of resistance to lateral bending, I place a core 4 therein which may be of wood, fibre, bakelite or the core may even be formed from a rubber composition which will vulcanize to a greater degree of hardness and resistance to bending than that of the surrounding coating.

The core 4 does not extend the full length of the body B but is preferably made somewhat shorter than the intermediate portion 1. The core 4 being entirely surrounded with the rubber coating, it is thoroughly protected from the weather and will, therefore, last indefinitely, which is not the case if the core or the entire runner is made of fibre or wood and exposed to the weather.

The end portions 2 being left deformable will yield to inaccuracies in the supporting members 5 used to hold the runner in position.

The lower edge of the intermediate portion 1 of the body is preferably rounded to more nearly fit the groove of a current collector in traveling across the bridge while the end portions 2 are preferably of rectangular cross section to fit in the open end socket 6 of the support member 5. The support member 5 may be secured to the insulating beam 7 of a section insulator by any suitable means, such as the bolt 7', or as shown in the aforesaid patent.

Mounted on the end portions 2 are the terminal or arcing members 3 which are shown secured thereto by thru-rivets 8 and which are positioned in the registering openings 9 and having the ends thereof headed over to fill the countersink in the openings 9. The ends of the rivets 8 if desired may be welded over and to the side walls 10 of the member 3 as, for instance, by the arc welding process.

The exposed end faces 11 of the terminal member 3 are angularly disposed to each other and project into a V-shape opening 12 in the supporting member 5, the walls of which are angularly disposed to each other similar to the walls 11. The member 3 is preferably spaced from the member 5 so that there is no electrical connection between the two but due to the overlapping adjacent portions of the members 3 and 5, the current collector will pass from one to the other without interference.

A modified form of terminal member is shown in Figs. 8 and 9 and is very similar to the form shown in Fig. 6 excepting it is preferably closed by a top wall 13 thus forming a longitudinal opening 14 to receive the end portion 2 of the body B. The side walls are shown bowed outwardly and on the inner faces are projecting studs 15. The terminal member shown in Fig. 8 is formed of a malleable metal and is positioned upon the portion 2 and then pressure is applied to the side walls thus forcing them inwardly and interlocking the projecting lugs 15 with the portion 2. The portion 2 being yieldable, the lugs 15 are readily interlocked therewith.

The bar 7 of the section insulator may be formed with a longitudinal groove 16 in its lower face and of sufficient width to receive the bridge B thus giving added rigidity to the assembled parts. By employing the core 4 to resist the intermediate portion of the bridge B bending, I am able to construct the bridge of smaller dimensions than otherwise and of a tough resilient and yieldable rubber which will withstand wear due to the passages of the current collector thereacross much better than if the bridge is made entirely of wood or fibre, which have been the usual materials in the past.

The core 4 is very easily positioned in the interior of the body by folding the rubber compound about the core 4 prior to placing the material in the curing mold.

The core may be made to form an integral union with the rubber covering of the intermediate portion by forming a vulcanized surface union between the parts at the time of curing the body.

The core 4 may be of metal but I prefer an insulating material which will give stiffness to the body.

I claim:

1. A runner for a section insulator comprising a single elongated body member formed of deformable rubber and having an intermediate portion and end portions, the end portions being of reduced cross section as compared with that of the intermediate portion, the intermediate portion having a core member to resist the lateral bending of the intermediate portion.

2. A runner for a section insulator comprising a single elongated body member formed of deformable rubber and having an intermediate portion and end portions, the end portions being of reduced cross section as compared with that of the intermediate portion, a core molded into the intermediate portion to resist the lateral bending of the intermediate portion, the end portions being free to yield under force.

3. A runner for a section insulator comprising an elongated rubber body formed of resilient rubber and having an intermediate portion and a projecting end portion at each end of the intermediate portion and a core positioned within the intermediate portion and completely enclosed by the rubber of the intermediate portion to resist the bending of the intermediate portion.

4. A runner for a section insulator comprising an elongated rubber body formed of resilient rubber and having an intermediate portion and a projecting end portion at each end of the intermediate portion, a core positioned within the intermediate portion and completely enclosed by the rubber of the intermediate portion to resist the bending of the intermediate portion, a metallic member mounted on each end portion adjacent the intermediate portion and means to secure the metallic member in position on its end portion.

5. A runner for a section insulator comprising a single elongated body formed of resilient rubber and having an intermediate portion and end portions, the end portions being of reduced cross section as compared with that of the intermediate portion, a core moulded into the intermediate portion to stiffen the intermediate portion, the end portions being free to yield under pressure and metal members mounted on the end portions adjacent the intermediate portion.

6. A bridging member for a section insulator comprising a single elongated body member formed of yieldable rubber and having an intermediate portion and projecting end portions from the ends of the intermediate portions, the cross section of the intermediate portion being greater than that of the end portions and a shoulder formed at the point where the section changes and a metal member mounted on each end portion and in abutting relation to the said shoulder.

7. A runner for a section insulator comprising a body composed of a tough, resilient molded material, metal members secured to the ends of the body and a member molded within the body between the metal members and of less length than the distance between the metal members to resist the body bending between the metal members.

8. A runner for a trolley wire device comprising in combination, a body member of bendable vulcanized rubber, arcing members of metal secured to the body member adjacent each end and a core positioned within the body intermediate the arcing members to stiffen the intermediate portion of the body against bending.

9. A runner for a section insulator comprising in combination a bendable vulcanized rubber body member, arcing members of metal secured to the body member adjacent each end and a core formed within the body intermediate the arcing members to stiffen the intermediate portion of the body gainst bending, the arcing members secured to the body member by concealed means.

10. A runner for a section insulator comprising in combination a body member formed of bendable vulcanized rubber, arcing members of metal secured to the body member adjacent each end and a fully concealed core formed within the body intermediate the arcing members to stiffen the intermediate portion of the body against bending.

11. A runner for a section insulator comprising in combination a bendable body of vulcanized rubber, arcing members of metal mounted on the body member adjacent each end and means positioned intermediate the arcing members to stiffen the intermediate portion of the body against bending, the length of the said means being less than the distance between the inner ends of the arcing members.

12. The combination with the insulating bar of a section insulator having a longitudinally disposed groove therein of a rubber runner removably disposed in said groove, means secured to the said bar and having means to receive the ends of the runner to hold it in position in said groove, the rubber runner having metal arcing members mounted on the ends of the runner and adjacent to but spaced from the aforesaid holding means and means molded within the runner intermediate the arcing members to stiffen the intermediate portion of the runner to resist its bending, the said means molded in the runner being of less length than the distance between the arcing members.

13. A runner for a trolley wire device comprising a single elongated body member formed of deformable rubber and having an intermediate portion and end portions projecting longitudinally therefrom, the intermediate portion having a stiffening core member adapted to resist the lateral bending of the intermediate portion.

14. A bridging member comprising in combination a body member of bendable vulcanized rubber and having an intermediate portion and end portions projecting therefrom, the intermediate portion provided with a core of insulating material to resist the lateral bending of the intermediate portion.

FRED L. WOLF.